US012632979B2

(12) United States Patent
    Jia

(10) Patent No.: US 12,632,979 B2
(45) Date of Patent: May 19, 2026

(54) METHOD AND DEVICE FOR TRAINING MODELS, METHOD AND DEVICE FOR DETECTING BODY POSTURES, AND STORAGE MEDIUM

(71) Applicant: BIGO TECHNOLOGY PTE. LTD., Singapore (SG)

(72) Inventor: Sen Jia, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 445 days.

(21) Appl. No.: 18/248,353

(22) PCT Filed: Oct. 26, 2021

(86) PCT No.: PCT/CN2021/126275
    § 371 (c)(1),
    (2) Date: Apr. 7, 2023

(87) PCT Pub. No.: WO2022/089391
    PCT Pub. Date: May 5, 2022

(65) Prior Publication Data
    US 2023/0377190 A1      Nov. 23, 2023

(30) Foreign Application Priority Data

Oct. 28, 2020    (CN) .......................... 202011176560.4

(51) Int. Cl.
    *G06K 9/00*          (2022.01)
    *G06T 7/70*          (2017.01)
        (Continued)

(52) U.S. Cl.
    CPC ................ *G06T 7/70* (2017.01); *G06T 15/02* (2013.01); *G06V 20/70* (2022.01); *G06V 2201/07* (2022.01)

(58) Field of Classification Search
    CPC ...... G06V 20/647; G06V 40/23; G06V 40/20; G06V 40/103; G06V 40/11;
        (Continued)

(56) References Cited

U.S. PATENT DOCUMENTS

2018/0174046 A1      6/2018   Xiao et al.
2019/0278983 A1*    9/2019   Iqbal ...................... G06N 3/084
            (Continued)

FOREIGN PATENT DOCUMENTS

CN          105069413 B      4/2018
CN          108875833 A      11/2018
            (Continued)

OTHER PUBLICATIONS

Sigal, L., Balan, A. O., & Black, M. J. (2010). Humaneva: Synchronized video and motion capture dataset and baseline algorithm for evaluation of articulated human motion. International journal of computer vision, 87(1), 4-27. (Year: 2010).*
            (Continued)

*Primary Examiner* — Gregory A Morse
*Assistant Examiner* — Kevin M Coomber
(74) *Attorney, Agent, or Firm* — Kolitch Romano Dascenzo Gates LLP

(57)          ABSTRACT

A method for training models is provided. The method includes: inputting an image training sample corresponding to a current iteration into a current posture detection network model, and acquiring a first loss function corresponding to the current iteration; re-projecting the current output result of the current posture detection network model, and acquiring a second loss function corresponding to the current iteration; and acquiring a posture detection network model for a next iteration by performing backpropagation on the current posture detection network model, and achieving training of the posture detection network model by perform-
            (Continued)

ing the next iteration before an iteration end condition is met.

17 Claims, 4 Drawing Sheets

(51) Int. Cl.
  *G06T 15/02* (2011.01)
  *G06V 20/70* (2022.01)
(58) Field of Classification Search
  CPC .... G06V 2201/07; G06V 20/70; G06V 40/10;
    G06V 20/64; G06V 40/107; G06V 10/82;
    G06V 10/774; G06N 3/08; G06N 3/084;
    G06N 3/0464; G06N 3/04; G06N 3/045;
    G06F 18/214; G06T 15/02; G06T 7/70
  See application file for complete search history.

(56) References Cited

U.S. PATENT DOCUMENTS

| | | | | |
|---|---|---|---|---|
| 2021/0158028 A1* | 5/2021 | Wu | .................. | G06V 10/774 |
| 2021/0200190 A1 | 7/2021 | Guo et al. | | |
| 2021/0232924 A1 | 7/2021 | Sun et al. | | |
| 2021/0279456 A1* | 9/2021 | Luo | .................. | G06T 7/75 |

FOREIGN PATENT DOCUMENTS

| | | | |
|---|---|---|---|
| CN | 108898628 A | 11/2018 |
| CN | 109063301 A | 12/2018 |
| CN | 109087329 A | 12/2018 |
| CN | 105787439 B | 4/2019 |
| CN | 109859296 A | 6/2019 |
| CN | 110020633 A | 7/2019 |
| CN | 111126272 A | 5/2020 |
| CN | 111208783 A | 5/2020 |
| CN | 111311729 A | 6/2020 |
| CN | 112307940 A | 2/2021 |

OTHER PUBLICATIONS

Shimada, S., Golyanik, V., Xu, W., & Theobalt, C. (2020). Physcap: Physically plausible monocular 3d motion capture in real time. ACM Transactions on Graphics (ToG), 39(6), 1-16. (Year: 2020).*

Peng, X., Tang, Z., Yang, F., Feris, R. S., & Metaxas, D. (2018). Jointly optimize data augmentation and network training: Adversarial data augmentation in human pose estimation. In Proceedings of the IEEE conference on computer vision and pattern recognition (pp. 2226-2234). (Year: 2018).*

Oberweger, M., & Lepetit, V. (2017). Deepprior++: Improving fast and accurate 3d hand pose estimation. In Proceedings of the IEEE international conference on computer vision Workshops (pp. 585-594). (Year: 2017).*

Jin, T., Duan, F., Yang, Z., Yin, S., Chen, X., Liu, Y., . . . & Jian, F. (2020). Markerless rat behavior quantification with cascade neural network. Frontiers in Neurorobotics, 14, 570313. (Year: 2020).*

China National Intellectual Property Administration, Second Office Action in Chinese Patent Application No. 202011176560.4 issued on Jan. 10, 2024, which is a foreign counterpart application corresponding to this U.S. Patent Application, to which this application claims priority.

Notice of Reasons for Refusal of Japanese application No. 2023-523270 issued on Jan. 22, 2024.

International Search Report of the International Searching Authority for State Intellectual Property Office of the People's Republic of China in PCT application No. PCT/CN2021/126275 issued on Jan. 26, 2022, which is an International application to which this application claims priority.

Extended European Search Report Communication Pursuant to Rule 62 EPC for European Application No. 21885118.6 dated Sep. 11, 2024, which is a foreign counterpart application to this application.

Luvizon, Diogo C., et al., "Human pose regression by combining indirect part detection and contextual information", Computers and Graphics, Elsevier, GB ,vol. 85, Sep. 11, 2019, pp. 15-22, ISSN: 0097-8493, DOI:10.1016/J.CAG.2019.09.002[retrieved on Sep. 11, 2019], the whole document.

* cited by examiner

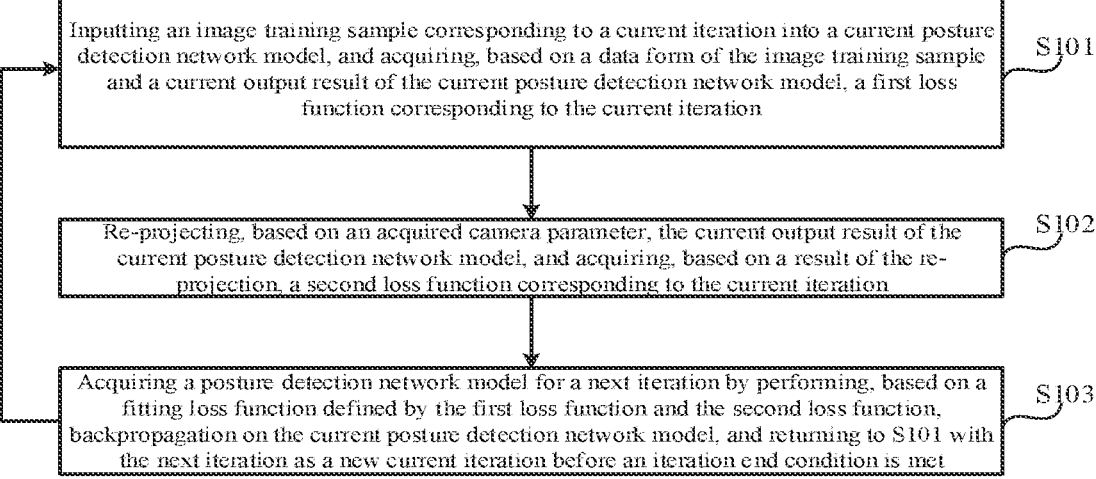

Inputting an image training sample corresponding to a current iteration into a current posture detection network model, and acquiring, based on a data form of the image training sample and a current output result of the current posture detection network model, a first loss function corresponding to the current iteration

S101

Re-projecting, based on an acquired camera parameter, the current output result of the current posture detection network model, and acquiring, based on a result of the re-projection, a second loss function corresponding to the current iteration

S102

Acquiring a posture detection network model for a next iteration by performing, based on a fitting loss function defined by the first loss function and the second loss function, backpropagation on the current posture detection network model, and returning to S101 with the next iteration as a new current iteration before an iteration end condition is met

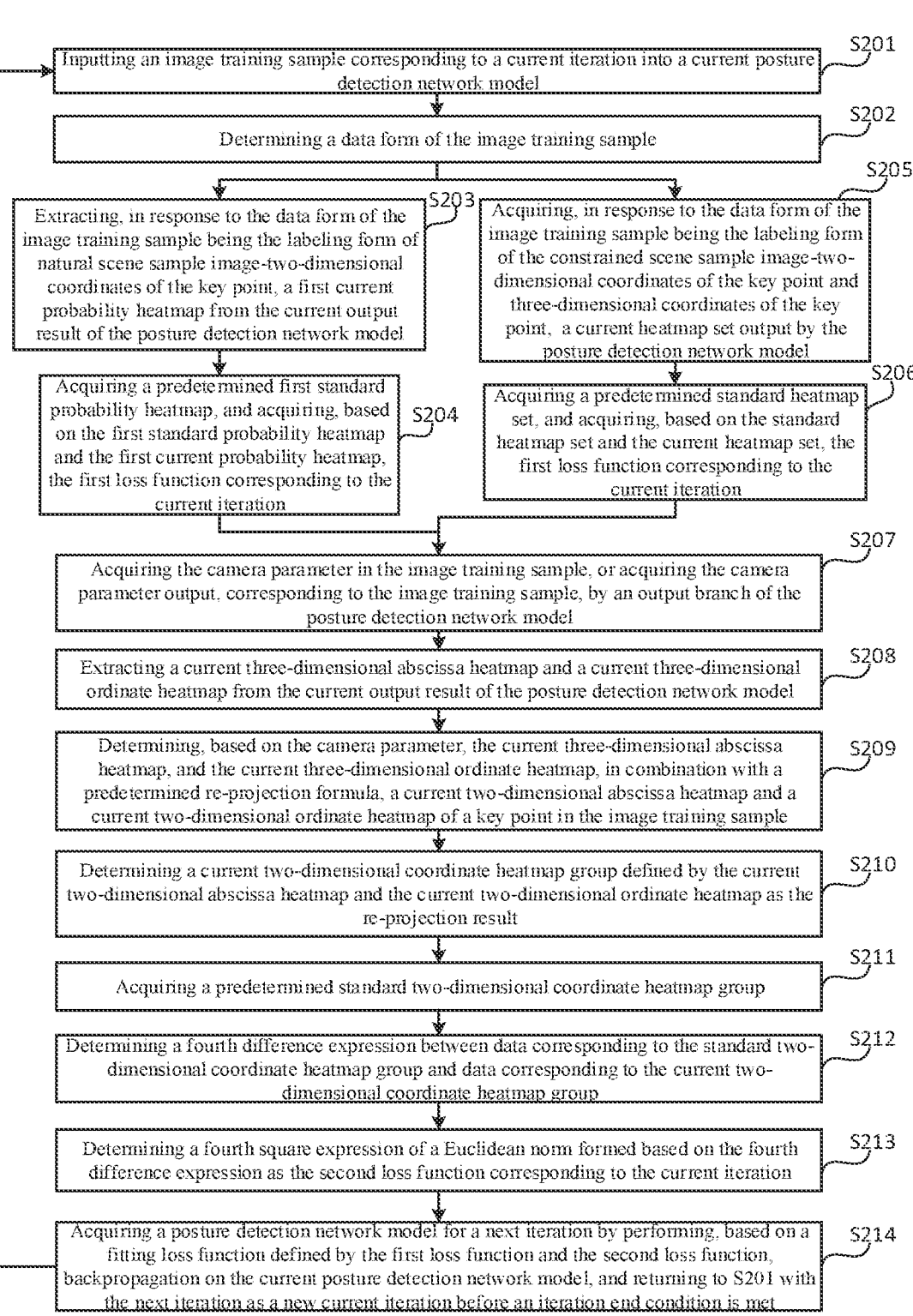

Inputting an image training sample corresponding to a current iteration into a current posture detection network model — S201

Determining a data form of the image training sample — S202

Extracting, in response to the data form of the image training sample being the labeling form of natural scene sample image-two-dimensional coordinates of the key point, a first current probability heatmap from the current output result of the posture detection network model — S203

Acquiring, in response to the data form of the image training sample being the labeling form of the constrained scene sample image-two-dimensional coordinates of the key point and three-dimensional coordinates of the key point, a current heatmap set output by the posture detection network model — S205

Acquiring a predetermined first standard probability heatmap, and acquiring, based on the first standard probability heatmap and the first current probability heatmap, the first loss function corresponding to the current iteration — S204

Acquiring a predetermined standard heatmap set, and acquiring, based on the standard heatmap set and the current heatmap set, the first loss function corresponding to the current iteration — S206

Acquiring the camera parameter in the image training sample, or acquiring the camera parameter output, corresponding to the image training sample, by an output branch of the posture detection network model — S207

Extracting a current three-dimensional abscissa heatmap and a current three-dimensional ordinate heatmap from the current output result of the posture detection network model — S208

Determining, based on the camera parameter, the current three-dimensional abscissa heatmap, and the current three-dimensional ordinate heatmap, in combination with a predetermined re-projection formula, a current two-dimensional abscissa heatmap and a current two-dimensional ordinate heatmap of a key point in the image training sample — S209

Determining a current two-dimensional coordinate heatmap group defined by the current two-dimensional abscissa heatmap and the current two-dimensional ordinate heatmap as the re-projection result — S210

Acquiring a predetermined standard two-dimensional coordinate heatmap group — S211

Determining a fourth difference expression between data corresponding to the standard two-dimensional coordinate heatmap group and data corresponding to the current two-dimensional coordinate heatmap group — S212

Determining a fourth square expression of a Euclidean norm formed based on the fourth difference expression as the second loss function corresponding to the current iteration — S213

Acquiring a posture detection network model for a next iteration by performing, based on a fitting loss function defined by the first loss function and the second loss function, backpropagation on the current posture detection network model, and returning to S201 with the next iteration as a new current iteration before an iteration end condition is met — S214

FIG. 2

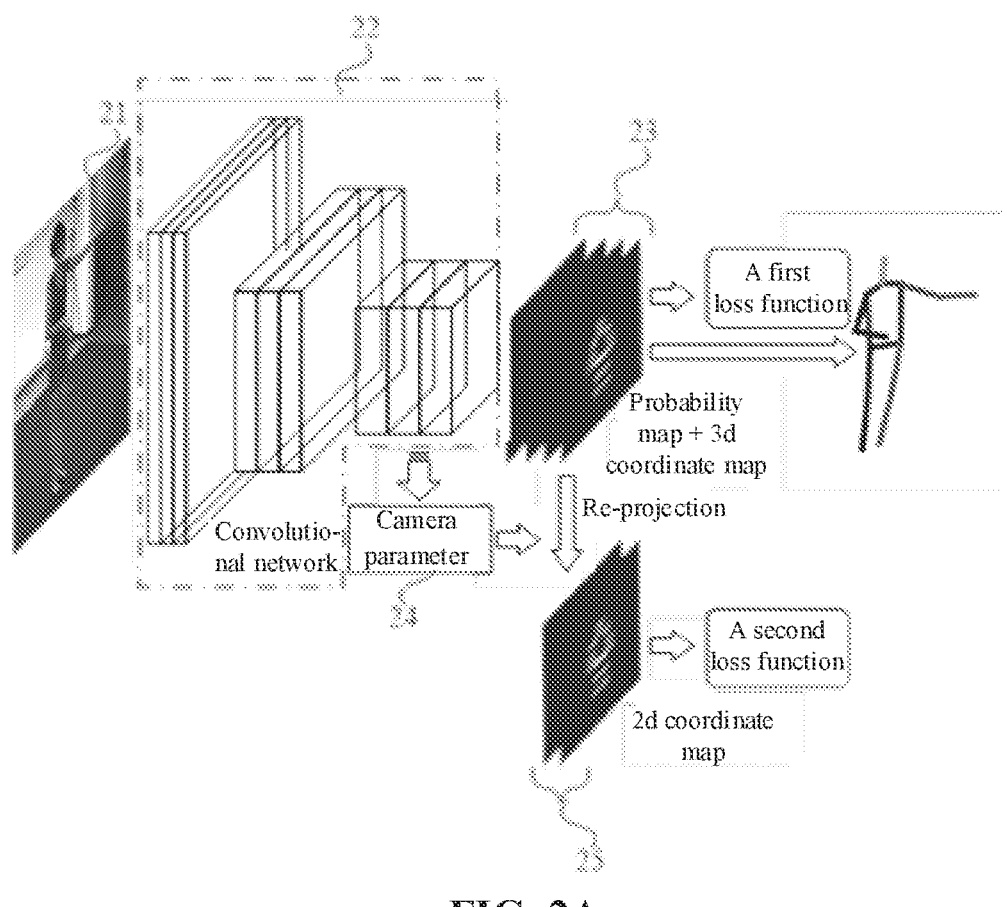

A first loss function

Probability map + 3d coordinate map

Re-projection

Convolutional network

Camera parameter

A second loss function 2d coordinate map

FIG. 2A

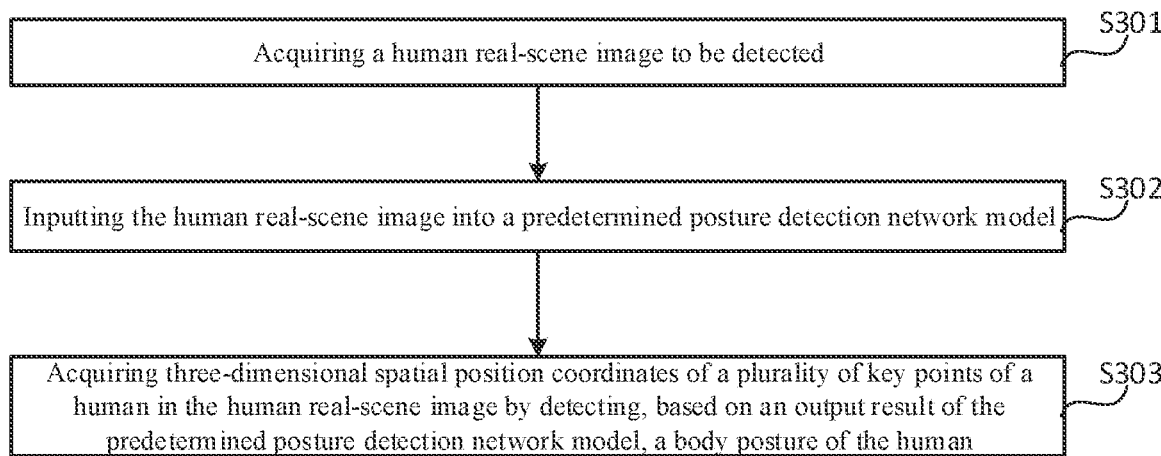

Acquiring a human real-scene image to be detected     S301

Inputting the human real-scene image into a predetermined posture detection network model     S302

Acquiring three-dimensional spatial position coordinates of a plurality of key points of a human in the human real-scene image by detecting, based on an output result of the predetermined posture detection network model, a body posture of the human     S303

FIG. 3

METHOD AND DEVICE FOR TRAINING MODELS, METHOD AND DEVICE FOR DETECTING BODY POSTURES, AND STORAGE MEDIUM

This application is a U.S. national stage of international application No. PCT/CN2021/126275, filed on Oct. 26, 2021, which claims priority to Chinese Patent Application No. 202011176560.4, filed on Oct. 28, 2020, and entitled "MODEL TRAINING METHOD, HUMAN BODY POS-TURE DETECTION METHOD AND DEVICE, EQUIP-MENT AND MEDIUM," the disclosures of which are herein incorporated by reference in their entireties.

TECHNICAL FIELD

The present disclosure relates to the technical field of spatial position detection, and in particular, to a method and a device for training models, a method and a device for detecting body postures, and a storage medium.

BACKGROUND OF THE INVENTION

With the rapid development of artificial intelligence technology, artificial neural networks are widely used. The artificial neural network, also known as a neural network, is a model simulating the connection structure of the brain synapse to process information. In the field of three-dimensional spatial position detection, a posture estimation neural network model for detecting the three-dimensional body posture is constructed using the neural network technology.

The research on three-dimensional body posture detection becomes an important topic in the field of computer vision. Such technology is considered as the basis of computer understanding of human behavior, and has wide application prospects in the fields of human-computer interaction, film special effects, interactive entertainment, and the like.

SUMMARY OF THE INVENTION

The present disclosure provides a method and a device for training models, a method and a device for detecting body postures, and a storage medium.

The present disclosure provides a method for training models. The method includes:

inputting an image training sample corresponding to a current iteration into a current posture detection network model, and acquiring, based on a data form of the image training sample and a current output result of the current posture detection network model, a first loss function corresponding to the current iteration;

re-projecting, based on an acquired camera parameter, the current output result of the current posture detection network model, and acquiring, based on a result of the re-projection, a second loss function corresponding to the current iteration; and acquiring a posture detection network model for a next iteration by performing, based on a fitting loss function defined by the first loss function and the second loss function, backpropagation on the current posture detection network model, and achieving training of the posture detection network model by performing the next iteration before an iteration end condition is met.

The present disclosure further provides a method for detecting body postures. The method includes:

acquiring a human real-scene image to be detected;

inputting the human real-scene image into a predetermined posture detection network model acquired by training using the method as defined in the embodiment of the first aspect; and acquiring three-dimensional spatial position coordinates of a plurality of key points of a human in the human real-scene image by detecting, based on an output result of the predetermined posture detection network model, a body posture of the human.

The present disclosure further provides a computer device for training models including a memory, a processor, and a computer program stored on the memory and runnable on the processor. The processor, when loading and running the computer program, is caused to perform the above method for training models.

The present disclosure further provides a computer device for detecting body postures including a memory, a processor, and a computer program stored on the memory and runnable on the processor. The processor, when loading and running the computer program, is caused to perform the above method for detecting body postures.

The present disclosure further provides a non-transitory computer-readable storage medium, storing a computer program thereon. The program, when loaded and run by a processor, causes the processor to perform the above method.

BRIEF DESCRIPTION OF DRAWINGS

FIG. 1 is a schematic flowchart of a method for training models according to embodiments of the present disclosure;

FIG. 2 is a schematic flowchart of a method for training models according to the embodiments of the present disclosure;

FIG. 2a is a structural schematic diagram of training a posture detection network model according to the embodiments of the present disclosure;

FIG. 3 is a schematic flowchart of a method for detecting body postures according to the embodiments of the present disclosure;

DETAILED DESCRIPTION

Figure 4:
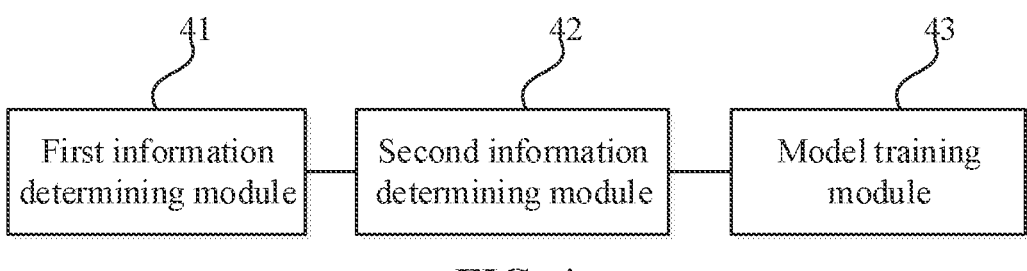
FIG. 4 is a structural block diagram of an apparatus for training models according to the embodiments of the present disclosure.

The present disclosure is described hereinafter with reference to the accompanying drawings and embodiments. The specific embodiments described herein are merely used to illustrate the present disclosure. In order to facilitate the description, only relevant portions of the present disclosure are shown in the drawings.

Before discussing exemplary embodiments, it should be noted that some exemplary embodiments are described as processes or methods depicted as flowcharts. Although the flowchart describes a plurality of sequential processes, many of the processes may be performed in parallel, concurrently, or simultaneously. In addition, the order of the plurality of processes may be rearranged. The process may be terminated in the case that the operations in the process are completed, but may have additional processes that are not included in the drawings. The process may correspond to a method, a function, a procedure, a subroutine, a subprogram, and the like.

Generally, body posture detection is to detect body key points from an image including a human, and to acquire three-dimensional spatial position coordinates of the body key points.

However, the posture detection neural network model for detecting the three-dimensional body posture has the following problems: 1) lack of high-quality labeled data in an unconstrained scene due to the lack of effective three-dimensional human labeling means in a natural scene in the art; and 2) the problem of difficulty in the convergence of the model. Therefore, accurate detection of the three-dimensional body posture in a natural scene cannot be achieved on the basis of the posture detection neural network model. The embodiments of the present disclosure are provided to solve the above discussed issues.

Embodiment I

FIG. 1 is a flowchart of a method for training models according to the embodiments of the present disclosure. In some embodiments, the method is performed by an apparatus for training models. The apparatus is implemented by software and/or hardware and is generally integrated into a computer device.

Among neural network models used for body posture detection, two common network models are the coordinate regression network model and the heatmap regression network model. The coordinate regression network model usually consists of a convolutional network as the input front end and a fully connected network as the output back end, and the three-dimensional coordinates of body key points are directly output by performing the body posture detection using the network model. However, such network models have the defects of difficulty in convergence and difficulty in the acquisition of three-dimensional labeled data in a natural scene. The heatmap regression network model usually consists of a fully convolutional network only, the output result is a coordinate heatmap of body key points, and three-dimensional coordinates of key points are acquired by subsequently analyzing the heatmap. Such network models have the defects of high requirements on training samples, and difficulty in the use of two-dimensional labeled data in an unconstrained scene, as well as difficulty in acquisition of three-dimensionally labeled data, such that the network is difficult to be applied to an actual scene. In view of this, the embodiments of the present disclosure provide a method for training models. The method utilizes a network structure of the heatmap regression network, and can effectively solve, based on easily acquired image training samples, the problems existing in the training of the above network models through a re-projection in an image domain.

As shown in FIG. 1, the method for training models according to the embodiments includes the following processes.

In S101, an image training sample corresponding to a current iteration is input into a current posture detection network model, and a first loss function corresponding to the current iteration is acquired based on a data form of the image training sample and a current output result of the current posture detection network model.

In the embodiments, the image training sample is a pre-acquired "sample image-labeled coordinates" data pair, in which the sample image is a monocular image including a human captured by a monocular camera, and the labeled coordinates are coordinates of key points of the human in the sample image. The coordinates of key points are two-dimensional plane coordinates of key points in the sample image; and in the case that the sample image is a specific image captured in a constrained scene, the coordinates of key points are three-dimensional spatial coordinates of key points in the constrained scene.

The monocular camera is a common image acquisition device, which has a wide application and is easy to acquire. The sample image in the image training sample of the embodiments may be acquired merely through the monocular camera, such that data required for training in the embodiments is easy to construct and acquire.

Meanwhile, the current iteration is understood as one of the iterations in the process of model training. In the embodiments, it is considered that the operation process of model training under each iteration during the iterative training of the model is the same.

In the process, upon entering the current iteration, an image training sample participating in the model training is selected from a pre-acquired training sample set. Then, the selected image training sample is input into a posture detection network model that needs to be trained under the current iteration. The posture detection network model in the embodiments is a heatmap regression network model constructed using a fully convolutional network structure. The posture detection network model processes the input image training sample, and at the same time, a first loss function required for model training corresponding to the current iteration is acquired based on the data form of the image training sample and the current output result of the current posture detection network model.

The data form of the image training sample in the embodiments includes: a labeling form of natural scene sample image-two-dimensional coordinates of a key point, or a labeling form of constrained scene sample image-two-dimensional coordinates of a key point and three-dimensional coordinates of the key point. That is, one case is that the sample image is captured in a natural scene, and the corresponding label is the two-dimensional coordinates of a key point; and the other case is that the sample image is captured in a constrained scene, and the corresponding label is the two-dimensional coordinates of a key point and the three-dimensional coordinates of the key point.

The image training samples with different data forms contain different data information. In the embodiments, the first loss function used for subsequent training is determined based on the data information in the image training sample. In some embodiments, in the case that the image training sample contains only two-dimensional coordinates of the key point, only data information corresponding to two-dimensional coordinates of the key point is combined with an output result of the network model to define the first loss function. In this way, it is ensured that the posture detection network model can effectively learn the image features in the natural scenario by introducing the first loss function acquired in this case into reverse learning.

In some embodiments, in the case that the image training sample further contains three-dimensional coordinates of the key point, data information corresponding to two-dimensional coordinates of the key point and three-dimensional coordinates of the key point are combined with an output result of the network model to define the first loss function. In this way, it is ensured that the posture detection network model can effectively learn the accurate three-dimensional posture prediction capability by introducing the first loss function acquired in this case into the reverse learning of the model.

In S102, a current output result of the current posture detection network model is re-projected based on an acquired camera parameter, and a second loss function corresponding to the current iteration is acquired based on a result of the re-projection.

In the embodiments, for training the posture detection network model, a plurality of loss functions are combined to achieve the effect of comprehensive training of the features. Therefore, upon the first loss function being determined by the above S101, the second loss function needs to be determined by S102 in the embodiments.

Upon the image training sample being processed through the posture detection network model, a current output result is acquired. The current output result includes a heatmap group required for determining the three-dimensional spatial coordinates for each key point. In the process, the current output result is re-projected into a two-dimensional space based on the camera parameter based on which the sample image in the image training sample is captured, such that a heatmap group of the key point in the two-dimensional space is acquired.

In the process, the re-projection result acquired by re-projecting the current output result is combined with a standard heat value group corresponding to the sample image in the image training sample in the two-dimensional space to acquire the second loss function under the current iteration. For the standard heat value group corresponding to the sample image in the two-dimensional space, assuming that the data form of the image training sample is labeling the three-dimensional coordinates of the key point, the standard heat value group is acquired by re-projecting the three-dimensional coordinates of the key point and then performing heatmap conversion; and assuming that the data form of the image training sample is labeling the two-dimensional coordinates of the key point, the heatmap conversion of the two-dimensional coordinates of the key point is directly performed.

In S103, a posture detection network model for the next iteration is acquired by performing, based on a fitting loss function defined by the first loss function and the second loss function, backpropagation on the current posture detection network model, and the model training returns to S101 with the next iteration as a new current iteration, until an iteration end condition is met.

In the embodiments, the first loss function and the second loss function are directly integrated to define the fitting loss function. An integration method in which a sum of the first loss function and the second loss function is determined as the fitting loss function is adopted in the embodiments.

In the training process of the neural network model, the backpropagation method allows a network weight (also called a filter) to be continuously updated and adjusted until the output of the network is consistent with a target, therefore, the method is an effective gradient calculation method. In the embodiments of the present disclosure, upon determining the fitting loss function corresponding to the current iteration, the posture detection network model with the adjusted network weight is acquired by performing backpropagation on the currently adopted posture detection network model using the fitting loss function, wherein the posture detection network model with the adjusted network weight can be used to train the model in the next iteration.

In the embodiments of the present disclosure, the backpropagation process is not limited and is set depending on the situations.

Upon the above S101 to S103 being performed, model training of one iteration is completed, and in this case, it is determined whether the iteration end condition is met upon the current iteration. In the case that the iteration end condition is not met, the model training returns to the above S101 again with the next iteration as a new current iteration. In the case that the iteration end condition is met, the model training is completed, and the method for training models according to the embodiments is ended. In some embodiments, the iteration end condition is that all of the image training samples in the sample set participate in the model training, or the change in network weights between the network model trained by the current iteration and the network model trained by the previous iteration is within a reasonable error range.

In the method for training models according to the embodiments of the present disclosure, the image training sample is not specifically limited, and the model training can be performed merely using a natural scene image with a two-dimensional label or a constrained scene image with a two-dimensional label and a three-dimensional label. Thus, the acquisition difficulty of the training sample is reduced, the field difference between the training data and the actual application scene is reduced, and the feasibility of network training is ensured. Meanwhile, compared with the traditional re-projection in a coordinate domain, the above solution simply and effectively achieves the re-projection in an image domain, and completes the whole model training in the image domain, which is more favorable for the stability and fast convergence of the model training. When the body posture detection is performed using the model trained in the above manner, three-dimensional spatial coordinates of key points of a human in a human image can be detected more accurately, and the accuracy of three-dimensional body posture detection is effectively improved. The method achieves effective training of a network model required for body posture detection, and also ensures the accuracy of body posture detection results.

Embodiment II

FIG. 2 is a schematic flowchart of a method for training models according to the embodiments of the present disclosure, and the embodiments are illustrated on the basis of the above embodiments. In the embodiments, acquiring, based on the data form of the image training sample and the current output result of the current posture detection network model, a first loss function corresponding to the current iteration includes: in response to the data form of the image training sample being the labeling form of natural scene sample image-two-dimensional coordinates of the key point, extracting a first current probability heatmap from the current output result of the posture detection network model; and acquiring a predetermined first standard probability heatmap, and acquiring, based on the first standard probability heatmap and the first current probability heatmap, the first loss function corresponding to the current iteration; wherein the first standard probability heatmap is determined by transforming the two-dimensional coordinates of the key point in the image training sample.

Alternatively, acquiring, based on the data form of the image training sample and the current output result of the current posture detection network model, the first loss function corresponding to the current iteration includes: in response to the data form of the image training sample being the labeling form of constrained scene sample image-two-dimensional coordinates of the key point and three-dimensional coordinates of the key points, acquiring a current heatmap set output by the posture detection network model, wherein the current heatmap set includes a second current probability heatmap and a current three-dimensional coordinate heatmap group; and acquiring a predetermined standard heatmap set, and acquiring, based on the standard heatmap set and the current heatmap set, the first loss function corresponding to the current iteration, wherein the standard heatmap set is determined by transforming the three-dimensional coordinates of the key point in the image training sample, and the standard heatmap set includes a second standard probability heatmap and a standard three-dimensional coordinate heatmap group.

Meanwhile, in the embodiments, re-projecting, based on the acquired camera parameter, the current output result of the current posture detection network model includes: acquiring the camera parameter in the image training sample, or acquiring the camera parameter output, corresponding to the image training sample, by an output branch of the posture detection network model; extracting a current three-dimensional abscissa heatmap and a current three-dimensional ordinate heatmap from the current output result of the posture detection network model; determining, based on the camera parameter, the current three-dimensional abscissa heatmap, and the current three-dimensional ordinate heatmap, in combination with a predetermined re-projection formula, determining a current two-dimensional abscissa heatmap and a current two-dimensional ordinate heatmap of a key point in the image training sample; and determining a current two-dimensional coordinate heatmap group defined by the current two-dimensional abscissa heatmap and the current two-dimensional ordinate heatmap as a re-projection result.

On the basis of the above solution, in the embodiments, acquiring, based on the result of the re-projection, the second loss function corresponding to the current iteration includes: acquiring a predetermined standard two-dimensional coordinate heatmap group, wherein the standard two-dimensional coordinate heatmap group is determined by transforming the two-dimensional coordinates of the key point or the three-dimensional coordinates of the key point in the image training sample, and includes a standard two-dimensional abscissa heatmap and a standard two-dimensional ordinate heatmap; determining a fourth difference expression between data corresponding to the standard two-dimensional coordinate heatmap group and data corresponding to the current two-dimensional coordinate heatmap group; and determining a fourth square expression of a Euclidean norm formed based on the fourth difference expression as the second loss function corresponding to the current iteration.

As shown in FIG. 2, the method for training models according to the embodiments of the present disclosure includes the following processes.

In S201, an image training sample corresponding to a current iteration is input into a current posture detection network model.

In S202, a data form of the image training sample is determined.

In the embodiments, the data form of the image training sample is determined based on the data information actually contained in the image training sample. In some embodiments, in the case that the image training sample includes a sample image and data information of two-dimensional coordinates of the key point and three-dimensional coordinates of the key point, the data form of the image training sample is considered as the labeling form of constrained scene sample image-two-dimensional coordinates of the key point and three-dimensional coordinates of the key point. In some other embodiments, in the case that the image training sample includes only a sample image and data information of two-dimensional coordinates of the key point, the data form is considered as the labeling form of natural scene sample image-two-dimensional coordinates of the key point.

In the embodiments, a determination process of the first loss function in the case that the data form is the labeling form of natural scene sample image-two-dimensional coordinates of the key point is given in the following S203 and S204.

In S203, in the case that the data form is the labeling form of natural scene sample image-two-dimensional coordinates of the key point, a first current probability heatmap is extracted from the current output result of the posture detection network model.

In the embodiments, regardless of the data form of the image training sample, the current output result acquired by the posture detection network model is a heatmap set corresponding to each key point, and the corresponding heatmap set actually includes a probability heatmap of the key point and a three-dimensional coordinate heatmap group representing three-dimensional spatial coordinates. In the process, the probability heatmap corresponding to each key point is extracted from the current output result of the acquired posture detection network model, and is recorded as the first current probability heatmap.

In S204, a first standard probability heatmap is acquired, and a first loss function corresponding to the current iteration is acquired based on the first standard probability heatmap and the first current probability heatmap.

In the embodiments, the first standard probability heatmap is understood as a real probability heatmap of a sample image in the image training sample, and the first standard probability heatmap is determined by transforming the two-dimensional coordinates of the key point in the image training sample. In some embodiments, upon the two-dimensional coordinates of the key point being known, the probability heatmap in the image domain is acquired through the two-dimensional coordinates in the coordinate domain.

The definition of the loss function in the model training usually depends on the result comparison of the result output by the model with the labeled real result. In the process, the first loss function corresponding to the current iteration is acquired by comparing data corresponding to the first standard probability heatmap with data corresponding to the first current probability heatmap.

In the embodiments, acquiring, based on the first standard probability heatmap and the first current probability heatmap, the first loss function corresponding to the current iteration includes: determining a first difference expression between data corresponding to the first standard probability heatmap and data corresponding to the first current probability heatmap; and determining a first square expression of a Euclidean norm based on the first difference expression as the first loss function corresponding to the current iteration.

In the embodiments, each heatmap is understood as a map matrix including a plurality of pixels having corresponding data values. In the embodiments, the map matrix is regarded as data corresponding to a heatmap, such that the first difference expression between the data corresponding to the first standard probability heatmap and the data corresponding to the first current probability heatmap is regarded as a matrix difference between the map matrix corresponding to the first standard probability heatmap and the map matrix corresponding to the first current probability heatmap.

For example, assuming that $$\hat{h}1$$

represents the map matrix of the first standard probability heatmap, and h1 represents the map matrix of the first current probability heatmap, the first difference expression is represented by $$\hat{h}1 - h1,$$

and $$\left\| \hat{h}1 - h1 \right\|_2$$

represents the Euclidean norm formed based on the first difference expression. In the embodiments, a square of $$\left\| \hat{h}1 - h1 \right\|_2$$

i.e., $$\left\| \hat{h}1 - h1 \right\|_2^2,$$

is regarded as the first square expression, and the first square expression is regarded as the first loss function corresponding to the current iteration, such that the first loss function is represented as:

$$\mathrm{Loss}1 = \left\| \hat{h}1 - h1 \right\|_2^2.$$

In the embodiments, a determination process of the first loss function in the case that the data form is the labeling form of constrained scene sample image-two-dimensional coordinates of the key point and three-dimensional coordinates of the key point is given in the following S205 and S206.

In S205, in the case that the data form is the labeling form of constrained scene sample image-two-dimensional coordinates of the key point and three-dimensional coordinates of the key point, a current heatmap set output by the posture detection network model is acquired.

In the embodiments, the current output result acquired upon the image training sample being processed by the posture detection network model actually includes a heatmap set corresponding to each key point, and the heatmap set is recorded as the current heatmap set in the embodiments. Moreover, in order to facilitate differentiation, in the process, a probability heatmap in the current heatmap set corresponding to the key point is recorded as a second current probability heatmap; and a three-dimensional coordinate heatmap group included is recorded as a current three-dimensional coordinate heatmap group.

In S206, a predetermined standard heatmap set is acquired, and a first loss function corresponding to the current iteration is acquired based on the standard heatmap set and the current heatmap set.

In the embodiments, the standard heatmap set is understood as a real heatmap set of a sample image in the image training sample, and the standard heatmap set is determined by transforming the two-dimensional coordinates of the key point and the three-dimensional coordinates of the key point in the image training sample. In some embodiments, upon determining the two-dimensional coordinates of the key point, a probability heatmap in the image domain is acquired based on the two-dimensional coordinates in the coordinate domain. Meanwhile, upon determining the three-dimensional coordinates of the key point, coordinate heatmaps respectively corresponding to three coordinate directions of the three-dimensional coordinates in the image domain are acquired based on the three-dimensional coordinates in the coordinate domain, and the coordinate heatmaps in the three coordinate directions constitute the three-dimensional coordinate heatmap group.

In the embodiments, the acquired probability heatmap is recorded as the second standard probability heatmap, and the three-dimensional coordinate heatmap group is recorded as the standard three-dimensional coordinate heatmap group. In addition, upon determining the three-dimensional coordinate heatmap group, the two-dimensional coordinate heatmap group of the image training sample is acquired by re-projection.

Similarly, in the case that the image training sample is in the above data form, the first loss function corresponding to the current iteration also needs to be determined based on the result comparison of the real result of the image training sample with the output result. In some embodiments, in the process, the first loss function corresponding to the current iteration is acquired by respectively comparing data corresponding to the second standard probability heatmap and data corresponding to the standard three-dimensional coordinate heatmap group with data corresponding to the second current probability heatmap and the current three-dimensional coordinate heatmap group.

In the embodiments, acquiring, based on the standard heatmap set and the current heatmap set, the first loss function corresponding to the current iteration includes: determining a second difference expression between data corresponding to the second standard probability heatmap and data corresponding to the second current probability heatmap; determining a third difference expression between data corresponding to the standard three-dimensional coordinate heatmap group and data corresponding to the current three-dimensional coordinate heatmap group; defining, based on the second difference expression, a second square expression of a Euclidean norm, and defining, based on the third difference expression, a third square expression of a Euclidean norm; and defining the first loss function corresponding to the current iteration by adding the second square expression to the third square expression.

Similarly, in the process, the data corresponding to the second standard probability heatmap and the data corresponding to the second current probability heatmap are both map matrices, and the data corresponding to the standard three-dimensional coordinate heatmap group and the data corresponding to the current three-dimensional coordinate heatmap group are each constituted by three map matrices.

For example, assuming that $$\hat{h}2$$

represents the map matrix of the second standard probability heatmap, and h2 represents the map matrix of the second current probability map, the second difference expression is represented by $$\hat{h}2 - h2;$$

and assuming that $$\hat{P}_{3d}$$

represents a set of map matrices of the standard three-dimensional coordinate heatmap group, and $P_{3d}$ represents a set of map matrices of the current three-dimensional coordinate heatmap group, the third difference expression is represented by $$\hat{P}_{3d} - P_{3d}.$$

Meanwhile, the second squared expression of the Euclidean norm formed based on the second difference expression is represented by $$\left\| \hat{h}2 - h2 \right\|_2^2$$

and the third square expression of the Euclidean norm formed based on the third difference expression is represented by $$\left\| \hat{P}_{3d} - P_{3d} \right\|_2^2.$$

Finally, the first loss function is expressed by $$\text{Loss1} = \left\| \hat{h}2 - h2 \right\|_2^2 + \left\| \hat{P}_{3d} - P_{3d} \right\|_2^2.$$

In the embodiments, an implementation process of the re-projection of the current output result is given in the following S207 to S210.

In S207, a camera parameter in the image training sample is acquired, or a camera parameter output, corresponding to the image training sample, by an output branch of the posture detection network model is acquired.

In the embodiments, the camera parameter of the sample image is directly contained in the formed image training sample, and in this case, the camera parameter in the image training sample is directly acquired in the process. Alternatively or additionally, in some embodiments, the camera parameter is not directly stored in the image training sample, but an output branch is additionally set in the posture detection network model, and the camera parameter extracted upon model processing is acquired from the output branch.

In S208, a current three-dimensional abscissa heatmap and a current three-dimensional ordinate heatmap are extracted from the current output result of the posture detection network model.

The current output result of the posture detection network model upon processing the sample image includes a probability heatmap and a three-dimensional coordinate heatmap group corresponding to the key point. In the embodiments, it is considered that the three-dimensional coordinate heatmap group in the current output result includes the current three-dimensional abscissa heatmap and the current three-dimensional ordinate heatmap. Therefore, the current three-dimensional abscissa heatmap and the current three-dimensional ordinate heatmap in the current output result are acquired by the process.

In S209, a current two-dimensional abscissa heatmap and a current two-dimensional ordinate heatmap of the key point in the image training sample are determined based on the camera parameter, the current three-dimensional abscissa heatmap, and the current three-dimensional ordinate heatmap, in combination with a predetermined re-projection formula.

In the embodiments, the camera parameters include focal length parameters $f_x$ and $f_y$ and primary optical axis parameters $c_x$ and $c_y$; the current three-dimensional abscissa heatmap is represented by a corresponding map matrix $P_{3d}(x)$; the current three-dimensional ordinate heatmap is represented by a corresponding map matrix $P_{3d}(y)$; and the re-projection formula is expressed as:

$$P_{2d}(x)=f_x \cdot P_{3d}(x)+c_x; \text{ and } P_{2d}(y)=f_y \cdot P_{3d}(y)+c_y,$$

wherein $P_{2d}(x)$ and $P_{2d}(y)$ respectively represent the current two-dimensional abscissa heatmap and the current two-dimensional ordinate heatmap of the corresponding key point in the image training sample.

In S210, a current two-dimensional coordinate heatmap group defined by the current two-dimensional abscissa heatmap and the current two-dimensional ordinate heatmap is determined as the re-projection result.

In the process, the current two-dimensional coordinate heatmap group defined based on the current two-dimensional abscissa heatmap and the current two-dimensional ordinate heatmap is regarded as the re-projection result of the re-projection process.

In the embodiments, a determining process of the second loss function is given in the following S211 to S213.

In S211, a predetermined standard two-dimensional coordinate heatmap group is acquired.

In the embodiments, the standard two-dimensional coordinate heatmap group is determined by transforming the two-dimensional coordinates of the key point in the image training sample, and the standard two-dimensional coordinate heatmap group includes a standard two-dimensional abscissa heatmap and a standard two-dimensional ordinate heatmap.

In S212, a fourth difference expression between data corresponding to the standard two-dimensional coordinate heatmap group and data corresponding to the current two-dimensional coordinate heatmap group is determined.

In the embodiments, the data corresponding to the standard two-dimensional coordinate heatmap group is represented by a map matrix $$\hat{P}_{2d}$$

of the standard two-dimensional coordinate heatmap group, and the current two-dimensional coordinate heatmap group is represented by a map matrix $P_{2d}$ of the standard current two-dimensional coordinate heatmap group, such that $$\hat{P}_{2d} - P_{2d}$$

is regarded as the fourth difference expression.

In S213, a fourth square expression of a Euclidean norm formed based on the fourth difference expression is determined as the second loss function corresponding to the current iteration.

In the embodiments, the fourth square expression of the Euclidean norm formed based on the fourth difference expression is represented by $$\left\| \hat{P}_{2d} - P_{2d} \right\|_2^2.$$

Finally, the second loss function is expressed by $$\text{Loss2} = \left\| \hat{P}_{2d} - P_{2d} \right\|_2^2.$$

In S214, a posture detection network model for the next iteration is acquired by performing, based on a fitting loss function defined by the first loss function and the second loss function, backpropagation on the current posture detection network model, and the model training returns to S201 with the next iteration as a new current iteration, until an iteration end condition is met.

In the embodiments, the fitting loss function is expressed in the form of Loss=Loss1+Loss2.

In order to facilitate understanding of the implementations of the method for training models according to the embodiments, FIG. 2a is a structural schematic diagram of training the posture detection network model according to the embodiments of the present disclosure. As shown in FIG. 2a, a sample image to be input 21, a posture detection network model 22, a first heatmap group 23 (including a probability heatmap and a three-dimensional coordinate heatmap group), camera parameters 24, and a second heatmap group 25 are given in FIG. 2a.

The first heatmap group 23 is mainly output by a core output branch of the network model, and is configured to determine three-dimensional spatial coordinates of body key points. As shown in FIG. 2a, a body contour map is determined based on the three-dimensional spatial coordinates of the body key points. The second heatmap group 25 is acquired mainly by re-projection based on the camera parameter 24 output by the other output branch of the network model in combination with the first heatmap group 23.

In the schematic diagram of model training given in FIG. 2a, the adopted image training sample is mainly captured by a monocular camera. Meanwhile, a first loss function Loss1 is mainly determined based on the first heatmap group 23 and the labeled data (two-dimensional coordinates of key points or three-dimensional coordinates of key points) corresponding to the sample image; and a second loss function Loss2 is mainly determined based on the second heatmap group 25 and the labeled data (two-dimensional coordinates of key points or three-dimensional coordinates of key points) corresponding to the sample image. It can be seen from the example that the method for training models according to the embodiments has the characteristic of easy acquisition of the training sample, and in addition, the training method has the characteristics of stable training and fast convergence, because the training is performed only in the image domain.

The method for training models according to the embodiments of the present disclosure illustrates a determining process of the first loss function and a determining process of the second loss function. In the method according to the embodiments, two loss functions for training and learning are set for the posture detection network model, and the determination of the two loss functions is achieved by the comparison of the probability heatmap, the three-dimensional coordinate heatmap group, and the two-dimensional coordinate heatmap group output by the posture detection network model with the standard probability heatmap, the standard three-dimensional coordinate heatmap group, and the standard two-dimensional coordinate heatmap group, respectively. The method can be implemented by semi-supervised training using image data easily acquired as the sample image in combination with the re-projection, and thus can acquire a model with good generalization capabilities. Moreover, in the method, only a fully convolutional structure in an image domain is adopted to ensure that the training process is performed completely in the image domain, such that the training influence factor of gradient vanishing or gradient exploding is avoided in the training process, and the purposes of stable training and fast convergence are achieved. Meanwhile, in the case that the body posture detection is performed using the model trained in the above manner, three-dimensional spatial coordinates of key points of a human in a human image can be detected more accurately, such that the accuracy of three-dimensional body posture detection is effectively improved.

Embodiment III

FIG. 3 is a schematic flowchart of a method for detecting body postures according to embodiments of the present disclosure. In some embodiments, the method is performed by an apparatus for detecting body postures. The apparatus is implemented by software and/or hardware and is generally integrated into a computer device. As shown in FIG. 3, the method includes the following processes.

In S301, a human real-scene image to be detected is acquired.

In some embodiments, the human real-scene image is acquired by a conventional image-capturing device, and the image-capturing device is a mobile phone, a notebook with a camera, a tablet, or the like. In the case that the body posture detection is required, the human real-scene image to be detected is acquired first by the process.

In S302, the human real-scene image is input into a predetermined posture detection network model.

The predetermined posture detection network model is acquired by training through any one of the methods for training models according to the embodiments of the present disclosure.

In S303, three-dimensional spatial position coordinates of a plurality of key points of a human in the human real-scene image are acquired by detecting, based on an output result of the predetermined posture detection network model, a body posture of the human.

In some embodiments, the output result of the posture detection network model upon the processing is a heatmap group corresponding to the key point. For each key point, the corresponding three-dimensional spatial position coordinates are acquired by acquiring the heatmap group and analyzing the heatmaps in the heatmap group.

In the method for detecting body postures according to the embodiments of the present disclosure, a heatmap group required for body posture detection is acquired using a posture detection network model which is acquired by training using the above method for training models. Based on the heatmap group acquired by the posture detection network model, three-dimensional spatial coordinates of key points of a human in a human image can be detected more accurately, such that the accuracy of body three-dimensional posture detection is effectively improved.

In some embodiments of the present disclosure, an optimized output result includes probability heatmaps and three-dimensional coordinate heatmap groups of plurality of key points. Correspondingly, in the embodiments, acquiring the three-dimensional spatial position coordinates of the plurality of key points of the human in the human real-scene image by detecting, based on the output result of the predetermined posture detection network model, the body posture of the human is optimized as follows: for each key point, determining a probability coordinate point corresponding to a maximum probability value from the probability heatmap, and acquiring a current position coordinate of the probability coordinate point; searching for heat values corresponding to the current position coordinate respectively from a three-dimensional abscissa heatmap, a three-dimensional ordinate heatmap, and a three-dimensional vertical heatmap in the three-dimensional coordinate map group; and defining, based on the searched heat values, three-dimensional spatial position coordinates of the each key point.

The implementation of determining the three-dimensional spatial position coordinates of the key point is given in the embodiments. It can be seen that, through the posture detection network model, a corresponding heatmap group is acquired for each key point with the three-dimensional spatial position coordinate to be determined. The heatmap group includes a probability heatmap of the key point, which shows probability values of the key point in different coordinates, and a three-dimensional coordinate heatmap group of the key point, which includes a three-dimensional abscissa heatmap, a three-dimensional ordinate heatmap, and a three-dimensional vertical heatmap. Each of the coordinate heatmaps shows coordinate values that the key point may have in the coordinate direction.

In the embodiments, a maximum probability value is determined from the probability heatmap of the key point. The maximum probability value corresponds to a probability coordinate point on the probability heatmap, and the maximum probability value indicates that the probability of the key point being located at the three-dimensional spatial position determined based on the probability coordinate point is the maximum. In the given three-dimensional coordinate heatmap group, the corresponding heat values at the probability coordinate point are searched for from different coordinate heatmaps, and the determined heat values are determined as coordinate values in the corresponding coordinate directions, such that the three-dimensional spatial position coordinates of the key point are constituted by the determined 3 coordinate values.

For example, assuming that the probability coordinate point determined from the probability heatmap is $(x1, y1)$, the points with the coordinate value of $(x1, y1)$ are searched for respectively in the three-dimensional abscissa heatmap, the three-dimensional ordinate heatmap, and the three-dimensional vertical heatmap, target heat values corresponding to the points in different heatmaps are acquired, and finally the three-dimensional spatial position coordinates of the key point is acquired on the basis of the 3 target heat values.

In some other embodiments, the method for detecting body postures further includes: converting the human real-scene image into a corresponding character cartoon image based on the three-dimensional spatial position coordinates of the plurality of key points of the human in the human real-scene image.

In the embodiments, the determined three-dimensional spatial position coordinates of the key points are used to convert the human real-scene image into the character cartoon image, that is, an actual application scene for three-dimensional body posture detection is given. Upon the three-dimensional spatial position coordinates of key points in the human real-scene image being determined, the original three-dimensional spatial position coordinates of key points in a reference character cartoon image are adjusted, such that the key points have the determined three-dimensional spatial position coordinates, that is, the adjustment of the body posture in the reference character cartoon image is achieved, thereby forming the character cartoon image corresponding to the human real-scene image.

Embodiment IV

FIG. 4 is a block diagram of an apparatus for training models according to the embodiments of the present disclosure. In some embodiments, the apparatus is implemented by software and/or hardware, is generally integrated into a computer device, and perform model training by performing the method for training models. As shown in FIG. 4, the apparatus includes: a first information determining module 41, a second information determining module 42, and a model training module 43.

The first information determining module 41 is configured to input an image training sample corresponding to a current iteration into a current posture detection network model, and acquire, based on a data form of the image training sample, a first loss function corresponding to the current iteration. The second information determining module 42 is configured to re-project, based on an acquired camera parameter, a current output result of the posture detection network model, and acquire, based on a result of the re-projection, a second loss function corresponding to the current iteration. The model training module 43 is configured to acquire a posture detection network model for a next iteration by performing, based on a fitting loss function defined by the first loss function and the second loss function, backpropagation on the posture detection network model, and achieve training of the posture detection network model by performing the next iteration before an iteration end condition is met.

In the apparatus for training models according to the embodiments of the present disclosure, the image training sample is not specifically limited, and the model training is performed merely using a natural scene image with a two-dimensional label or a constrained scene image with a two-dimensional label and a three-dimensional label, such that the acquisition difficulty of the training sample is reduced, the field difference between the training data and the actual application scene is reduced, and the feasibility of network training is ensured. Meanwhile, compared with the traditional re-projection in a coordinate domain, the above solution simply and effectively achieves the re-projection in an image domain, and completes the whole model training in the image domain, which is more favorable for the stability and fast convergence of the model training. In the case that the body posture detection is performed using the model trained in the above manner, three-dimensional spatial coordinates of key points of a human in a human image can be detected more accurately, such that the accuracy of three-dimensional body posture detection is effectively improved.

Embodiment V

Figure 5:
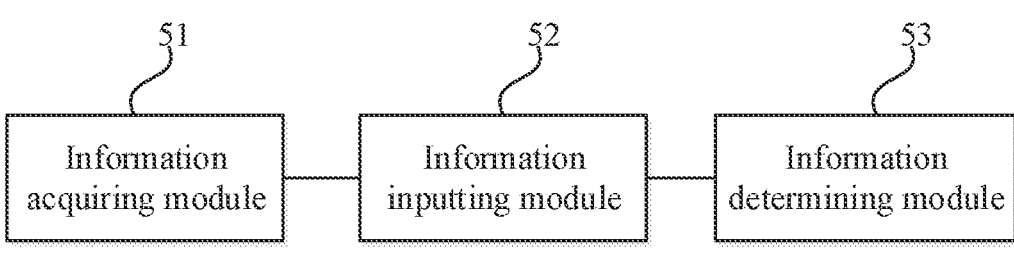
FIG. 5 is a structural block diagram of an apparatus for detecting body postures according to the embodiments of the present disclosure.

FIG. 5 is a structural block diagram of a structure of an apparatus for detecting body postures according to the embodiments of the present disclosure. In some embodiments, the apparatus is implemented by software and/or hardware, is generally integrated into a computer device, and achieves the determination of three-dimensional spatial positions of body key points by performing the method for detecting body postures. As shown in FIG. 5, the apparatus includes: an information acquiring module 51, an information inputting module 52, and an information determining module 53.

The information acquiring module 51 is configured to acquire a human real-scene image to be detected. The information inputting module 52 is configured to input the human real-scene image into a predetermined posture detection network model, wherein the predetermined posture detection network model is acquired by training using the method for training models according to the embodiments of the present disclosure. The information determining module 53 is configured to acquire three-dimensional spatial position coordinates of a plurality of key points of a human in the human real-scene image by detecting, based on an output result of the predetermined posture detection network model, a body posture of the human.

In the apparatus for detecting body postures according to the embodiments, a heatmap group required for human body posture detection is acquired using a posture detection network model, which is acquired by training using the above method for training models. Based on the heatmap group acquired by the posture detection network model, three-dimensional spatial coordinates of key points of a human in a human image can be detected more accurately, such that the accuracy of three-dimensional body posture detection is effectively improved.

Embodiment VI

Figure 6:
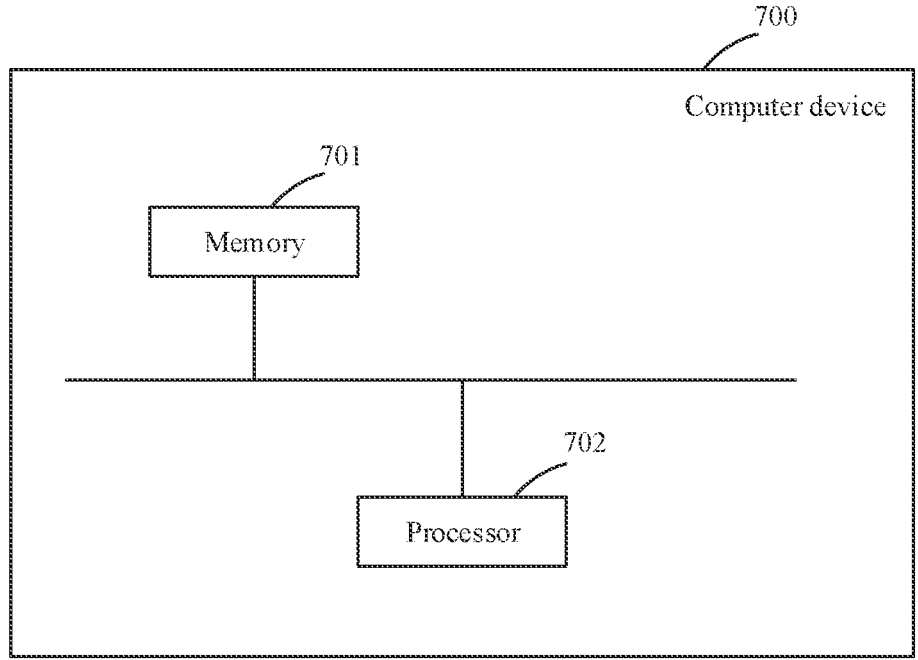
FIG. 6 is a structural block diagram of a computer device according to the embodiments of the present disclosure.

FIG. 6 is a structural block diagram of a computer device according to the embodiments of the present disclosure. The embodiments of the present disclosure provide a computer device, and in some embodiments, the apparatus for training models and/or the apparatus for detecting body postures according to the embodiments of the present disclosure is integrated into the computer device.

As shown in FIG. 6, the computer device 700 includes a memory 701, a processor 702, and a computer program stored on the memory 701 and runnable on the processor 702. The processor 702, when loading and running the computer program, is caused to perform the method for training models and/or the method for detecting body postures according to the embodiments of the present disclosure.

Meanwhile, the embodiments further provide a storage medium storing computer-executable instructions. The computer-executable instructions, when loaded and run by a computer processor, cause the processor to perform the method for training models and/or the method for detecting body postures according to the embodiments of the present disclosure.

Storage medium may be any of various types of memory devices or storage devices. The term "storage medium" is intended to include: an installation medium, e.g., a compact disc read-only memory (CD-ROM), a floppy disk, or a tape; a computer system memory or random access memory, such as a dynamic random access memory (DRAM), a double data rate random access memory (DDRRAM), a static random access memory (SRAM), an extended data output random access memory (EDORAM), and Rambus random access memory (Rambus RAM); a non-volatile memory, such as a flash memory, a magnetic medium (e.g., hard disk or optical storage); a register or other similar types of memory elements, etc. In some embodiments, the storage medium is a non-transitory storage medium, and the storage medium further includes other types of memories or combinations thereof. In addition, the storage medium is located in a first computer system in which the program is executed, or located in a different second computer system connected to the first computer system through a network, such as the Internet. In some embodiments, the second computer system provides program instructions to the first computer for execution. The term "storage medium" includes two or more storage media that reside in different locations, e.g., in different computer systems that are connected through a network. The storage medium stores program instructions (e.g., implemented as a computer program) that are executable by one or more processors.

The apparatus for training models, the apparatus for detecting body postures, the storage medium, and the computer device according to the above embodiments is capable of performing the method according to the corresponding embodiments of the present disclosure, and have the corresponding functional modules and achieves similar effects. For technical details which are not described in detail in the above embodiments, reference may be made to the method according to the corresponding embodiments of the present disclosure.

What is claimed is:

1. A method for training models, comprising:

inputting an image training sample corresponding to a current iteration into a current posture detection network model, and acquiring, based on a data form of the image training sample and a current output result of the current posture detection network model, a first loss function corresponding to the current iteration;

re-projecting, based on an acquired camera parameter, the current output result of the current posture detection network model, and acquiring, based on a result of the re-projection, a second loss function corresponding to the current iteration; and acquiring a posture detection network model for a next iteration by performing, based on a fitting loss function defined by the first loss function and the second loss function, backpropagation on the current posture detection network model, and achieving training of the posture detection network model by performing the next iteration before an iteration end condition is met;

wherein the posture detection network model is a heatmap regression network model constructed using a fully convolutional network structure; and the data form of the image training sample comprises: a labeling form of natural scene sample image-two-dimensional coordinates of a key point, or a labeling form of constrained scene sample image-two-dimensional coordinates of the key point and three-dimensional coordinates of the key point;

wherein acquiring, based on the data form of the image training sample and the current output result of the current posture detection network model, the first loss function corresponding to the current iteration comprises:

in response to the data form of the image training sample being the labeling form of the constrained scene sample image-two-dimensional coordinates of the key point and three-dimensional coordinates of the key point, acquiring a current heatmap set output by the posture detection network model, wherein the current heatmap set comprises a second current probability heatmap and a current three-dimensional coordinate heatmap group; and acquiring a predetermined standard heatmap set, and acquiring, based on the standard heatmap set and the current heatmap set, the first loss function corresponding to the current iteration;

wherein the standard heatmap set is determined by transforming the three-dimensional coordinates of the key point in the image training sample, and the standard heatmap set comprises a second standard probability heatmap and a standard three-dimensional coordinate heatmap group.

2. The method according to claim 1, wherein acquiring, based on the data form of the image training sample and the current output result of the current posture detection network model, the first loss function corresponding to the current iteration comprises:

in response to the data form of the image training sample being the labeling form of natural scene sample image-two-dimensional coordinates of the key point, extracting a first current probability heatmap from the current output result of the posture detection network model; and acquiring a predetermined first standard probability heatmap, and acquiring, based on the first standard probability heatmap and the first current probability heatmap, the first loss function corresponding to the current iteration;

wherein the first standard probability heatmap is determined by transforming the two-dimensional coordinates of the key point in the image training sample.

3. The method according to claim 2, wherein acquiring, based on the first standard probability heatmap and the first current probability heatmap, the first loss function corresponding to the current iteration comprises:

determining a first difference expression between data corresponding to the first standard probability heatmap and data corresponding to the first current probability heatmap; and determining a first square expression of a Euclidean norm formed based on the first difference expression as the first loss function corresponding to the current iteration.

4. The method according to claim 1, wherein acquiring, based on the standard heatmap set and the current heatmap set, the first loss function corresponding to the current iteration comprises:

determining a second difference expression between data corresponding to the second standard probability heatmap and data corresponding to the second current probability heatmap;

determining a third difference expression between data corresponding to the standard three-dimensional coordinate heatmap group and data corresponding to the current three-dimensional coordinate heatmap group;

defining, based on the second difference expression, a second square expression of a Euclidean norm, and defining, based on the third difference expression, a third square expression of a Euclidean norm; and defining the first loss function corresponding to the current iteration by adding the second square expression to the third square expression.

5. The method according to claim 1, wherein re-projecting, based on the acquired camera parameter, the current output result of the posture detection network model comprises:

acquiring the camera parameter in the image training sample, or acquiring the camera parameter output, corresponding to the image training sample, by an output branch of the posture detection network model;

extracting a current three-dimensional abscissa heatmap and a current three-dimensional ordinate heatmap from the current output result of the posture detection network model;

determining, based on the camera parameter, the current three-dimensional abscissa heatmap, and the current three-dimensional ordinate heatmap, in combination with a predetermined re-projection formula, a current two-dimensional abscissa heatmap and a current two-dimensional ordinate heatmap of a key point in the image training sample; and determining a current two-dimensional coordinate heatmap group defined by the current two-dimensional abscissa heatmap and the current two-dimensional ordinate heatmap as the re-projection result.

6. The method according to claim 5, wherein acquiring, based on the result of the re-projection, the second loss function corresponding to the current iteration comprises:

acquiring a predetermined standard two-dimensional coordinate heatmap group, wherein the standard two-dimensional coordinate heatmap group is determined by transforming the two-dimensional coordinates of the key point or the three-dimensional coordinates of the key point in the image training sample, and comprises a standard two-dimensional abscissa heatmap and a standard two-dimensional ordinate heatmap;

determining a fourth difference expression between data corresponding to the standard two-dimensional coordinate heatmap group and data corresponding to the current two-dimensional coordinate heatmap group; and determining a fourth square expression of a Euclidean norm formed based on the fourth difference expression as the second loss function corresponding to the current iteration.

7. The method according to claim 1, wherein the fitting loss function is a sum of the first loss function and the second loss function.

8. The method according to claim 1, wherein a sample image in the image training sample is a monocular image captured by a monocular camera.

9. A method for detecting body postures, comprising:

acquiring a human real-scene image to be detected;

inputting the human real-scene image into a predetermined posture detection network model; and acquiring three-dimensional spatial position coordinates of a plurality of key points of a human in the human real-scene image by detecting, based on an output result of the predetermined posture detection network model, a body posture of the human;

wherein the predetermined posture detection network model is acquired by:

inputting an image training sample corresponding to a current iteration into a current posture detection network model, and acquiring, based on a data form of the image training sample and a current output result of the current posture detection network model, a first loss function corresponding to the current iteration;

re-projecting, based on an acquired camera parameter, the current output result of the current posture detection network model, and acquiring, based on a result of the re-projection, a second loss function corresponding to the current iteration; and acquiring a posture detection network model for a next iteration by performing, based on a fitting loss function defined by the first loss function and the second loss function, backpropagation on the current posture detection network model, and achieving training of the posture detection network model by performing the next iteration before an iteration end condition is met;

wherein the posture detection network model is a heatmap regression network model constructed using a fully convolutional network structure; and the data form of the image training sample comprises: a labeling form of natural scene sample image-two-dimensional coordinates of one of the plurality of key points, or a labeling form of constrained scene sample image-two-dimensional coordinates of the one of the plurality of key points and three-dimensional coordinates of the one of the plurality of key points;

wherein acquiring, based on the data form of the image training sample and the current output result of the current posture detection network model, the first loss function corresponding to the current iteration comprises:

in response to the data form of the image training sample being the labeling form of the constrained scene sample image-two-dimensional coordinates of the one of the plurality of key points and three-dimensional coordinates of the one of the plurality of key points, acquiring a current heatmap set output by the posture detection network model, wherein the current heatmap set comprises a second current probability heatmap and a current three-dimensional coordinate heatmap group; and acquiring a predetermined standard heatmap set, and acquiring, based on the standard heatmap set and the current heatmap set, the first loss function corresponding to the current iteration;

wherein the standard heatmap set is determined by transforming the three-dimensional coordinates of the one of the plurality of key points in the image training sample, and the standard heatmap set comprises a second standard probability heatmap and a standard three-dimensional coordinate heatmap group.

10. The method according to claim 9, wherein the output result comprises probability heatmaps and three-dimensional coordinate heatmap groups of the plurality of key points;

acquiring the three-dimensional spatial position coordinates of the plurality of key points of the human in the human real-scene image by detecting, based on the output result of the predetermined posture detection network model, the body posture of the human comprises:

determining, for each key point, a probability coordinate point corresponding to a maximum probability value from the probability heatmap, and acquiring a current position coordinate of the probability coordinate point;

searching for heat values corresponding to the current position coordinate respectively from a three-dimensional abscissa heatmap, a three-dimensional ordinate heatmap, and a three-dimensional vertical heatmap in the three-dimensional coordinate map group; and defining, based on the searched heat values, three-dimensional spatial position coordinates of the each key point.

11. The method according to claim 9, further comprising:

converting, based on the three-dimensional spatial position coordinates of the plurality of key points of the human in the human real-scene image, the human real-scene image into a corresponding character cartoon image.

12. A computer device for training models, comprising a memory, a processor, and a computer program stored on the memory and runnable on the processor, wherein the processor, when loading and running the computer program, is caused to perform:

inputting an image training sample corresponding to a current iteration into a current posture detection network model, and acquiring, based on a data form of the image training sample and a current output result of the current posture detection network model, a first loss function corresponding to the current iteration;

re-projecting, based on an acquired camera parameter, the current output result of the current posture detection network model, and acquiring, based on a result of the re-projection, a second loss function corresponding to the current iteration; and acquiring a posture detection network model for a next iteration by performing, based on a fitting loss function defined by the first loss function and the second loss function, backpropagation on the current posture detection network model, and achieving training of the posture detection network model by performing the next iteration before an iteration end condition is met;

wherein the posture detection network model is a heatmap regression network model constructed using a fully convolutional network structure; and the data form of the image training sample comprises: a labeling form of natural scene sample image-two-dimensional coordinates of a key point, or a labeling form of constrained scene sample image-two-dimensional coordinates of the key point and three-dimensional coordinates of the key point;

wherein acquiring, based on the data form of the image training sample and the current output result of the current posture detection network model, the first loss function corresponding to the current iteration comprises:

in response to the data form of the image training sample being the labeling form of the constrained scene sample image-two-dimensional coordinates of the key point and three-dimensional coordinates of the key point, acquiring a current heatmap set output by the posture detection network model, wherein the current heatmap set comprises a second current probability heatmap and a current three-dimensional coordinate heatmap group; and acquiring a predetermined standard heatmap set, and acquiring, based on the standard heatmap set and the current heatmap set, the first loss function corresponding to the current iteration;

wherein the standard heatmap set is determined by transforming the three-dimensional coordinates of the key point in the image training sample, and the standard heatmap set comprises a second standard probability heatmap and a standard three-dimensional coordinate heatmap group.

13. A non-transitory computer-readable storage medium, storing a computer program thereon, wherein the program, when loaded and run by a processor, causes the processor to perform the method for training models as defined in claim 1.

14. A computer device for detecting body postures, comprising a memory, a processor, and a computer program stored on the memory and runnable on the processor, wherein the processor, when loading and running the computer program, is caused to perform the method for detecting body postures as defined in claim 9.

15. A non-transitory computer-readable storage medium, storing a computer program thereon, wherein the program, when loaded and run by a processor, causes the processor to perform the method for detecting body postures as defined in claim 9.

16. The computer device for training models according to claim 12, wherein the processor, when loading and running the computer program, is caused to perform:

in response to the data form of the image training sample being the labeling form of natural scene sample image-two-dimensional coordinates of the key point, extracting a first current probability heatmap from the current output result of the posture detection network model; and acquiring a predetermined first standard probability heatmap, and acquiring, based on the first standard probability heatmap and the first current probability heatmap, the first loss function corresponding to the current iteration;

wherein the first standard probability heatmap is determined by transforming the two-dimensional coordinates of the key point in the image training sample.

17. The computer device for training models according to claim 16, wherein the processor, when loading and running the computer program, is caused to perform:

determining a first difference expression between data corresponding to the first standard probability heatmap and data corresponding to the first current probability heatmap; and determining a first square expression of a Euclidean norm formed based on the first difference expression as the first loss function corresponding to the current iteration.

\* \* \* \* \*